(12) United States Patent
Lat et al.

(10) Patent No.: US 7,273,337 B2
(45) Date of Patent: Sep. 25, 2007

(54) PARTIALLY COATED FASTENER ASSEMBLY AND METHOD FOR COATING

(75) Inventors: Geronimo E. Lat, Ivanhoe, IL (US); Daniel P. McDonald, Palatine, IL (US); Henry W. Schniedermeier, Glenview, IL (US); Paul L. Hicks, Judsonia, AR (US); Harold D. Gray, Augusta, AR (US); Donald E. Bergstrom, Lake Villa, IL (US); Guenther Kram, Bartlett, IL (US); Garry F. Tupek, Naperville, IL (US)

(73) Assignee: Illinois Tool Works Inc., Glenview, IL (US)

(*) Notice: Subject to any disclaimer, the term of this patent is extended or adjusted under 35 U.S.C. 154(b) by 123 days.

(21) Appl. No.: 10/610,228

(22) Filed: Jun. 30, 2003

(65) Prior Publication Data

US 2004/0265092 A1    Dec. 30, 2004

(51) Int. Cl.
    *F16B 15/08*    (2006.01)
(52) U.S. Cl. ............ 411/443; 411/446; 411/487; 411/903; 411/914; 29/458
(58) Field of Classification Search ............ 29/458; 411/903, 443, 914, 487, 446
    See application file for complete search history.

(56) References Cited

U.S. PATENT DOCUMENTS

| | | | | |
|---|---|---|---|---|
| 1,867,353 A | * | 7/1932 | Dickson | 470/7 |
| 1,942,249 A | * | 1/1934 | Kleinschmit | 59/71 |
| 2,522,656 A | * | 9/1950 | Whalen | 59/77 |
| 2,718,647 A | * | 9/1955 | Raible | 470/40 |
| 2,724,303 A | * | 11/1955 | Holcomb | 411/439 |
| 3,234,572 A | * | 2/1966 | Roser | 470/40 |
| 3,267,660 A | * | 8/1966 | Matthews | 59/77 |
| 3,451,839 A | * | 6/1969 | Cauvin | 427/191 |
| 3,635,389 A | * | 1/1972 | Shibata | 228/3.1 |
| 3,813,985 A | * | 6/1974 | Perkins | 411/442 |
| 3,853,606 A | * | 12/1974 | Parkinson | 428/461 |
| 3,877,414 A | * | 4/1975 | Brideau et al. | 118/234 |
| 4,004,061 A | * | 1/1977 | Creighton et al. | 428/349 |
| 4,114,505 A | * | 9/1978 | Loeser et al. | 427/388.4 |

(Continued)

FOREIGN PATENT DOCUMENTS

EP    0697531 A1    2/1996

(Continued)

OTHER PUBLICATIONS www.epoxyproducts.com/5_urethane.html (Attached).*

(Continued)

*Primary Examiner*—Katherine Mitchell
(74) *Attorney, Agent, or Firm*—Pauley Petersen & Erickson

(57) ABSTRACT

A fastener assembly includes a row of fasteners having a head, a tip, and a portion of a shank coated with a polymer composition. The polymer composition includes a polymer material such as polyurethane and metal particles. The polymer composition is used to provide improved corrosion and ultraviolet radiation resistance when used with naturally corrosive or pressure preservative treated wood. The fastener assembly is coated with the polymer composition by vacuum coating a dispersion of the polymer composition in a solvent such as water and removing the solvent.

23 Claims, 2 Drawing Sheets

U.S. PATENT DOCUMENTS

| | | | | |
|---|---|---|---|---|
| 4,275,813 | A | * | 6/1981 | Noiles .................. 206/339 |
| 4,307,000 | A | * | 12/1981 | Vasta .................. 106/264 |
| 4,353,325 | A | * | 10/1982 | Argazzi .................. 118/683 |
| 4,452,834 | A | * | 6/1984 | Nachtkamp et al. ........ 427/379 |
| 4,537,632 | A | * | 8/1985 | Mosser .................. 106/14.12 |
| 4,600,662 | A | | 7/1986 | Broomfield et al. |
| 4,606,967 | A | * | 8/1986 | Mosser .................. 428/220 |
| 4,664,733 | A | * | 5/1987 | Masago .................. 156/212 |
| 4,679,975 | A | * | 7/1987 | Leistner .................. 411/443 |
| 4,802,807 | A | * | 2/1989 | Offenburger et al. .... 411/387.1 |
| 4,837,090 | A | * | 6/1989 | Hyner et al. ................ 428/626 |
| 4,897,231 | A | * | 1/1990 | Scheurer et al. .......... 264/46.7 |
| 4,964,774 | A | * | 10/1990 | Lat et al. .................. 411/446 |
| 5,033,181 | A | * | 7/1991 | Lat et al. .................. 29/433 |
| 5,116,672 | A | * | 5/1992 | Mosser et al. .............. 428/328 |
| 5,149,237 | A | * | 9/1992 | Gabriel et al. .............. 411/446 |
| 5,178,903 | A | * | 1/1993 | Lat et al. .................. 427/446 |
| 5,208,077 | A | * | 5/1993 | Proctor et al. .............. 427/461 |
| 5,272,223 | A | * | 12/1993 | Iri et al. .................. 525/452 |
| 5,279,649 | A | * | 1/1994 | Stetson et al. .......... 106/14.12 |
| 5,359,735 | A | * | 11/1994 | Stockwell .................. 2/243.1 |
| 5,427,821 | A | | 6/1995 | Hegedus et al. |
| 5,441,373 | A | * | 8/1995 | Kish et al. .................. 411/442 |
| 5,478,413 | A | * | 12/1995 | Mosser et al. .............. 148/261 |
| 5,564,876 | A | * | 10/1996 | Lat .............................. 411/439 |
| 5,575,865 | A | * | 11/1996 | Isenberg et al. ............ 148/265 |
| 5,655,969 | A | * | 8/1997 | Lat .............................. 470/5 |
| 5,733,085 | A | * | 3/1998 | Shida et al. ................ 411/442 |
| 5,803,990 | A | * | 9/1998 | Mosser et al. .............. 148/261 |
| 5,882,405 | A | * | 3/1999 | Kish et al. .................. 118/122 |
| 6,086,305 | A | * | 7/2000 | Lat et al. .................... 411/487 |
| 6,095,739 | A | * | 8/2000 | Albertson et al. .......... 411/439 |
| 6,273,974 | B1 | * | 8/2001 | Lat et al. .................... 148/639 |
| 6,352,687 | B1 | * | 3/2002 | Ismailer et al. .............. 424/61 |
| 6,428,630 | B1 | * | 8/2002 | Mor et al. .................. 148/254 |
| 6,436,474 | B2 | * | 8/2002 | Godsted et al. ............. 427/318 |
| 6,544,351 | B2 | * | 4/2003 | Wang et al. .................. 148/22 |
| 6,682,801 | B2 | * | 1/2004 | Imahashi et al. ............. 428/90 |
| 6,740,424 | B2 | * | 5/2004 | Endo et al. .................. 428/558 |
| 2001/0051080 | A1 | * | 12/2001 | Godsted et al. ............ 411/82.2 |
| 2004/0115022 | A1 | * | 6/2004 | Albertson et al. ............ 411/13 |
| 2004/0116559 | A1 | * | 6/2004 | Lenz et al. .................. 524/90 |
| 2004/0126201 | A1 | * | 7/2004 | Kobylinski et al. ........... 411/13 |
| 2004/0156696 | A1 | * | 8/2004 | Grosch ........................ 411/378 |
| 2006/0069224 | A1 | * | 3/2006 | Pritschins et al. ........ 526/318.2 |

FOREIGN PATENT DOCUMENTS

| | | | |
|---|---|---|---|
| GB | 1283494 | * | 6/1970 |
| GB | 1471977 | | 4/1977 |
| JP | 2002053769 A | * | 2/2002 |
| JP | 2002 053769 | | 6/2002 |

OTHER PUBLICATIONS www.gordonengland.co.uk/xcorrosion.html (Attached).*
www.chomerics.com/products/documents/emicat/pg140.... (Attached).*
NPL http://dictionary.reference.com/search?q=aromatic.*

* cited by examiner

PARTIALLY COATED FASTENER ASSEMBLY AND METHOD FOR COATING

FIELD OF THE INVENTION

This invention is related to a fastener assembly including a row of adjacent metal fasteners. The invention is directed to a method for partially coating the fasteners, particularly a head, a tip, at least a portion of an upper shank portion, and/or (in various combinations) at least a portion of a lower shank portion of the fasteners, of the fastener assembly with a polymer coating, as well as the partially coated fastener assembly. The polymer composition for coating the fasteners includes a pigment material and a polymer material such as a predominantly aliphatic polyurethane.

BACKGROUND OF THE INVENTION

Fasteners, such as nails, staples, brads, and pins, that are to be subjected to exterior or weathering applications are typically made from wire that has been plated, or galvanized, usually with zinc. Aluminum has sometimes been introduced in the plating process with zinc for enhanced corrosion performance as well.

The plating step is typically either electrolytic or via a molten zinc, or zinc and aluminum bath or pot. The latter is characterized as a "hot dipping" process.

The steel used for the fastener may be composed of various chemistries and demonstrate significant property differences depending upon the degree of cold working through conventional wire drawing practices, differences in the basic steel constituents, and whether or not a stress relieving (patenting or annealing) process stage has been introduced.

Such plated fasteners are commonly used with pressure treated wood. Pressure treating is used to prevent decay and insect damage to wood used for playground equipment, decks, landscaping ties, and fence posts. Copper chromated arsenate (CCA) has been a common preservation treatment for wood. As CCA includes arsenic, alternatives to CCA, such as alkaline copper quatenary (ACQ), are presently available. The chemical treatment of pressure treated wood, such as ACQ wood, can react with metal fasteners to corrode the fasteners.

Fast-acting fastener driving tools are commonplace in the building industry. Fasteners, such as nails, are assembled in strips that are adapted for use in a magazine of such tools. The strips are flat, the nails or other fasteners are parallel, and the fasteners are maintained in position using a collating component, typically including an adhesive and a backing material, to bind the nails or other fasteners together in a parallel arrangement, to provide a collated strip of fasteners for use in fastener driving tools.

In order to improve the weathering resistance of fastener assemblies for use with fastener driving tools, particularly when used with treated wood products, there is a need or desire for a coating which has the ability to provide improved corrosion resistance. There is also a need for improved methods for applying such coatings to fasteners, and particularly fastener assemblies for use with fastener driving tools.

SUMMARY OF THE INVENTION

The present invention is directed to a fastener assembly including a plurality of fasteners arranged in a row and connected by a collation component. A polymer coating composition coats at least one of the fastener heads, the fastener tips, at least a portion of the shanks between the heads and the collation component, and at least a portion of the shanks between the tips and the collation component. The fasteners can be "T" nails, staples, pins, brads or the like, typically made from steel having various chemistries and mechanical properties. The polymer coating composition provides improved corrosion protection, particularly when used with naturally corrosive or treated wood, such as ACQ wood products. The polymer coating composition includes a pigment material, such as aluminum particles. The balance of the coating composition is a polymer material which can include, for example, a polyurethane polymer or a combination of a polyurethane polymer and an acrylic polymer.

The fastener assembly of this invention can be made by a method including applying a protective plating, such as a galvanized zinc plating, over substantially all of the metal surface of each fastener to form a plated fastener. A collation component is applied to the plated fasteners. A portion of the fastener assembly is coated, preferably by vacuum coating, with a coating composition including a polymer material and a pigment material dispersed in a solvent. The solvent is removed upon cooling, leaving a polymer composition coating including the polymer material and the pigment on the portion of the fastener assembly.

Vacuum coating is accomplished by creating a vacuum in a coating chamber and subsequently introducing the coating composition into the coating chamber. The portions of the fastener assembly to be coated, preferably at least one of the head, the tip, the upper shank portion, and the lower shank portion of each of the fasteners, are introduced into the coating chamber. The coating composition in the coating chamber coats the portion of each fastener within the coating chamber and, upon coating, the coated portion of the fastener assembly is removed from the coating chamber.

With the foregoing in mind, it is a feature and advantage of the invention to provide a fastener assembly having a polymer coating which provides corrosion and ultraviolet resistance.

It is also a feature and advantage of the invention to provide a polymer coating composition. The coating composition includes a polymer material and a pigment material dispersed in water.

These and other features and advantages of the invention will become further apparent from the following detailed description of the presently preferred embodiments, read in conjunction with the accompanying examples and drawings. The detailed description, examples and drawings are intended to be illustrative rather than limiting, with the scope of the invention being defined by the appended claims and equivalents thereof.

DETAILED DESCRIPTION OF THE PRESENTLY PREFERRED EMBODIMENTS

Figure 1:
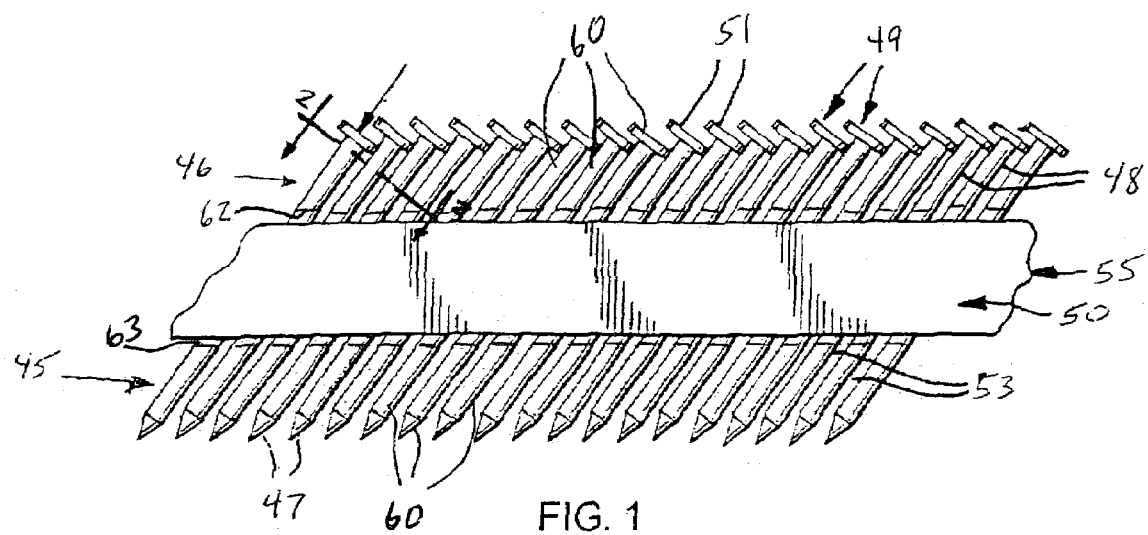
FIG. 1 is a top plan view of a nail assembly according to the invention.
Figure 2:
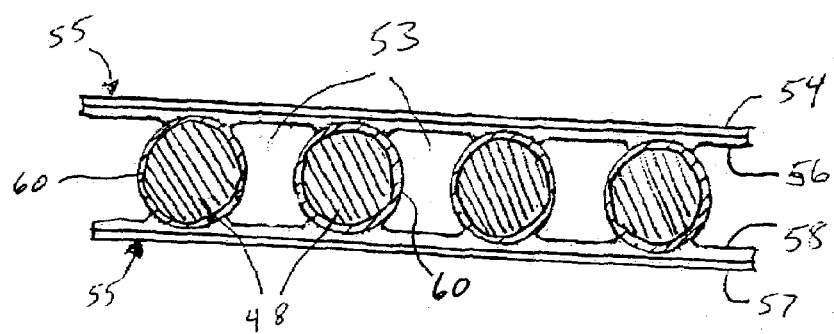
FIG. 2 is a sectional view of a nail assembly according to the invention, taken along the line 2-2 in FIG. 1.

FIGS. 1 and 2 show a fastener assembly according to one embodiment of this invention and provided by the method described below. Referring to FIGS. 1 and 2, a nail assembly, generally designated as 50, is arranged in a flat planar configuration with a plurality of nails parallel to each other. The nail assembly 50 is useable in a metal fastener driving tool having an angled magazine. The nail assembly includes two essential components, a plurality of nails 49 and at least one (desirably two) collation component. The collation component holds the individual fasteners together in the desired fastener assembly arrangement. As will be appreciated by one skilled in the art, various types of collation components as known in the art are available for use with the fastener assembly of this invention. The collation component shown in FIGS. 1 and 2 is a collation tape 55. An example of a suitable collation tape is disclosed in commonly assigned U.S. Pat. No. 5,733,085, issued on 31 Mar. 1998 to Mitsuzo et al., herein incorporated by reference.

As shown in FIGS. 1 and 2, the collation tape 55 includes adhesive layers 56 and 58 bonded to the nails and holding them in a parallel configuration with spaces 53 between the nails 49. In the preferred embodiment shown, the two adhesive layers 56 and 58 sandwich the row of nails between the layers. The adhesive layers 56 and 58 are covered on their outer surfaces by backing layers 54 and 57, preferably constructed of paper or brittle plastic. The backing layers can be used to reinforce the adhesive layers 56 and 58, and can also be used for printing and labeling. A preferred backing layer is brown kraft paper, which is strong and tends to blend in with the color of the wood being penetrated by the nails. As will be appreciated by one skilled in the art, other collation means and components known in the art can be used in form the fastener assembly of this invention.

Each of the nails 49 has a head 51, a triangular shaped tip 47 on an opposite end from the head 51, and a shank 48 between the head 51 and the tip 47. As shown in FIG. 1, the heads 51 of adjacent nails partially overlap each other. Furthermore, the head 51 of each leading nail preferably touches the shank 48 of the closest trailing nail, in order to help maintain the alignment of the nails.

The shank 48 can have various cross-sectional shapes, such as round, square rectangular, oval, and polygonal. The shank 48 includes an upper shank portion 46 and a lower shank portion 45. As used herein, the "upper shank portion" of the fastener refers to the portion of the shank between the fastener head and an edge of the attached collation component closest the fastener head. As used herein, the "lower shank portion" of the fastener refers to the portion of the shank between the fastener tip and an edge of the attached collation component closest the fastener tip. As will be appreciated by one skilled in the art following the teachings herein provided, the collation component can vary in width and can be attached at various positions on the shank. Thus, the size of the upper shank portion and the lower shank portion can vary depending on the size of the fastener, the size of the collation component, and the location of attachment of the collation component on the fastener shank.

The nails 49 are slanted relative to the collation tape 55. The degree of slanting is between about 10-40 degrees, preferably about 15-25 degrees, where a zero degree slant is perpendicular to the collation tape 55. This slanting is what permits the round head 51 to overlap when the nails are in uniform parallel alignment. By overlapping the heads 51, the distance between the adjacent nail shanks 48 can be less than would be required if the nails were aligned perpendicular to the collation tape 55 with the respective head portions positioned edge to edge. The distance between shanks can be further reduced by providing the nail heads with a truncated circular shape (e.g., a half circle or three-quarter circle with a flat edge) instead of making them completely round.

The fasteners of this invention can be constructed of any metal commonly used for fasteners, including steel, cooper, aluminum, zinc and various other metals and metal alloys. For instance staples and nails are commonly formed from carbon steel. The fasteners of this invention can be plated, or galvanized, by means, such as electrolytic plating, and materials, such as zinc, known in the art to provide improved corrosion resistance. The fasteners can be plated over substantially all, and desirably all, of the metal surface of the fastener.

The fastener assembly of this invention includes a polymer composition coating at least one of the head, the tip, at least a portion of the shank between the head and the collation component, and at least a portion of the shank between the tip and the collation component. The polymer composition coating provides improved corrosion resistance to the coated portion(s) of the individual fasteners, particularly when the fasteners are driven into pressure treated wood. As shown in FIG. 1, each of the nails 49 includes a polymer composition coating 60 on the head 51 and a portion of the upper shank portion 46, as well as the tip 47 and a portion of the lower shank portion 45. The polymer composition coating 60 partially coats the upper shank portion 46 of the shank 48, from the head 51 to a polymer composition coating edge 62 above the collation tape 55. The polymer composition coating 60 also partially coats the lower shank portion 45 of the shank 48, from the tip 47 to a polymer composition coating edge 63 below the collation tape 55. As discussed above, the length of the upper shank portion and the lower shank portion relative to the total length of the shank is dependent on the placement and size of the collation component.

As will be appreciated by one skilled in the art following the teachings herein provided, the entire fastener assembly, including the collation component, can be coated according to this invention and the methods described herein. In another embodiment the collation component can be only partially coated such as along with the upper and/or lower shank portions. In one desired embodiment of this invention, the collation component is not coated with the polymer composition, and only the head, tip, upper shank portion and/or lower shank portion of each fastener is/are desirably coated. Not coating the collation component is particularly desirable when the collation component includes text or graphics that would be hidden if coated by the polymer composition of this invention.

In one embodiment of this invention, the portion of each fastener that is coated is less than about 50% of a total length of the plated fastener, more suitably about 10% to about 20% of the total length of the plated fastener. In another embodiment, about ⅜ inch (about 0.95 centimeters) or less of the shank directly adjacent to at least one of the head and the tip includes a coating of the polymer composition.

The polymer composition used for coating the head and upper shank of the fastener includes a polymer material and a pigment material. The polymer material can include any synthetic or natural polymer, as well as polymer combinations. Preferred polymer materials contemplated by this invention include water-dispersible, thermoplastic polymer materials that contain as a major constituent thereof a film-forming aliphatic polyurethane polymer. As used herein, the term "aliphatic" includes straight-chain aliphatic as well as alicyclic or cycloaliphatic polyurethane resins. In one embodiment of this invention the polymer composition includes (on a dry weight basis) about 50% to about 95% by weight polymer material and about 5% to about 50% by weight pigment material, more suitably about 70% to about 95% by weight polymer material and about 5% to about 30% by weight pigment material, and desirably about 80% to about 90% by weight polymer material and about 10% to about 20% by weight pigment material. One suitable polymer material includes a polyurethane polymer. The polymer material can include additional polymers, such as acrylic polymers, alone or in combination with the polyurethane polymer. Suitable acrylic polymers include Neocryl® A -622 and Neocryl® A -623, available from NeOResins, Wilmington, Mass., as well as Maincote™ HG56, available from Rohm & Haas Company, Philadelphia, Pa. The polymer composition can also include additional filler materials, such as corrosion protection materials and ultraviolet radiation protection materials, for additional protection.

In one embodiment of this invention, the pigment material includes metal particles. The metal particles can be formed of various metals including, for example, aluminum, zinc, tin, cadmium, copper, bronze, magnesium, or combinations thereof. The metal particles can be in the form of regular or irregular shaped particles including spheres, diamonds, flakes, and a wide variety of other shapes. The metal particles may have an average particle diameter of about 1-100 microns, suitably about 5-75 microns, desirably about 10-50 microns. If the average particle size is too large, the metal polymer composition may be difficult to extrude or otherwise apply to the fasteners. If the average particle size is too small, the metal particles may behave like clumps of dust that are difficult to disperse in the polymer.

In one preferred embodiment of this invention, the pigment material includes aluminum particles. The aluminum particles can be in the form of aluminum powder or aluminum paste. Aluminum paste typically includes aluminum particles in a solvent, such as mineral spirits. Examples of aluminum pastes useful as the pigment material of this invention are sold under the name Aquasil®, available from Silberline®, Tamaqua, Pa., in particle sizes ranging from about 18.8 microns to 55.2 microns. Using aluminum or other metal particles as the pigment material has a benefit of matching or blending with the metallic coloration of the galvanized fastener.

Other pigment materials, such as those known in the art, can also be used in the polymer composition of this invention. In one embodiment of this invention, the pigment material is an organic pigment. In another embodiment of this invention the pigment material is pearl essence.

In one embodiment of this invention, the polymer composition can be included in a coating composition for applying the polymer composition to the fastener assembly, more particularly at least one of the heads, the tips, a portion of the upper shank portion, and a portion of the lower shank portion of the fasteners. The coating composition includes the polymer composition discussed above dispersed in a solvent. In one embodiment, the coating composition is an aqueous coating composition wherein the polymer composition is dispersed in water. Other solvents can also be used instead of water, preferably solvents that evaporate readily, such as acetone, to facilitate efficient removal of the solvent during drying. The coating composition of this invention suitably includes about 5% to about 30% solids, desirably about 15% to about 20% solids, to reduce, and preferably eliminate, polymer composition bridging the space between the individual fasteners of the fastener assembly. In other words, if the amount of solids in the coating composition is too high, the coating composition upon drying can undesirably form a film of the polymer composition between the individual fasteners, such as forming a polymer composition film over the spaces 53 between the nails 49 as shown in FIG. 1, as well as coating the desired portion of the individual fasteners.

The aqueous coating composition can be applied to each individual fastener, by such methods as described below, so as to provide, upon drying to remove the water or other solvent, a polymer composition deposited on the fastener as a substantially continuous film encasing the fastener and having a thickness of about 0.2 mils to about 5.0 mils, suitably about 1.0 mil to about 3.0 mils. Upon removal of the water or other solvent, an aliphatic polyurethane resin may include crosslinked aliphatic polyurethane chains.

In one embodiment of this invention, a method for forming a fastener assembly includes applying a protective plating, such as a zinc plating, over all, or at least substantially all, of the metal surface of the individual fasteners to form plated or galvanized fasteners. The fasteners can optionally be cleaned and are then arranged in a row and the collation component is applied to form the fastener assembly. The coating composition is applied to a portion of the fasteners, more particularly at least one of the heads, the tips, at least a portion of the upper shank portion, and at least a portion of the lower shank portion, by vacuum coating, followed by removing the water or other solvent, leaving a coating of the polymer composition including the polymer material and the pigment material on the portion of the plated fastener.

Vacuum coating refers to the deposition of a film or coating in a vacuum or an otherwise low pressure environment. Vacuum coating the fastener assembly can be accomplished by creating a vacuum in a coating chamber. As used herein, a "vacuum" refers to a space or area, such as within the coating chamber, in which the pressure is lower than the ambient pressure. The coating composition is introduced, such as by spraying, into the vacuum in the coating chamber, resulting in filling, or flooding, the coating chamber with the coating composition. The portion of the fastener assembly to be coated, such as, for example, the head and upper shank portion, is introduced in the coating chamber, resulting in the coating of the portion of the fastener assembly. Upon coating, the portion of the coated fastener assembly is removed from the coating chamber.

Upon removing the coated fastener assembly from the coating chamber vacuum, any excess coating is generally wiped off by the onrushing air. The onrushing air also facilitates drying the coating composition to remove the water or other solvent. In addition, the vacuum coating process can have a cooling effect on the fastener assembly. The fastener assembly is typically heated during application of the collation component, often as high as 450° F. (about 232° C.), and cooled before vacuum coating, desirably to less than about 200° F. (about 93° C.), and more desirably at least as low as about 140° F. (about 60° C.) to 160° F. (about 71° C.). The vacuum coating process disclosed herein further cools the fastener assembly. As the fastener assembly is generally not packaged when hot, this cooling effect can provide the additional benefits of requiring fewer production steps, i.e., additional drying time and machinery are not needed, allowing for faster packaging.

The coating composition can be applied to the fastener assembly by methods other than vacuum coating. For example, the coating composition can be applied by spraying the coating composition on the fasteners or partially dipping the fastener assembly into the coating composition and drying the coating composition, such as by blowing, to remove the water or other solvent.

A preferred method for making a fastener assembly according to this invention includes providing a plurality of fasteners. The fasteners can be formed from wire stock. A plating, typically a zinc plating, is applied to the wire stock to form galvanized wire stock. The fasteners are formed by cutting galvanized wire stock into cut wire segments and forming a head on one end of the cut wire segments. The fasteners are cleaned by cleaning methods known in the art, such as known alkaline cleaning systems.

The fasteners are arranged in a row on a conveyor, such as a conventional band conveyor. The fasteners are maintained in a configuration that exposes one or both sides of the row of fasteners to application of at least one collation component on at least one side of the fasteners shanks using heat and pressure, thereby providing a fastener assembly, such as shown in FIGS. 1 and 2. After the fastener assembly is heated to apply the collation component, the fastener assembly is at least partially cooled before partially coating the fastener assembly with a coating composition, suitably to a temperature of less than about 200° F. (about 93° C.), and desirably at least about 140° F. (about 60° C.) to about 160° F. (about 71° C.).

A coating composition is prepared by mixing a polymer composition, such as described above, including a polymer material and a pigment material in a solvent such as water. The coating composition is applied to at least one of the fastener heads, the fastener tips, at least a portion of the fastener upper shank portions, and at least a portion of the fastener lower shank portions. The coating composition is applied by vacuum coating. The head, tip, portion of the upper shank portion, and/or portion of the lower shank portion is/are passed through the coating chamber through an opening in the coating chamber. The coating chamber is flooded with the coating composition, which coats the portion of each of the fasteners within the coating chamber.

Upon coating, the fastener assembly exits the coating chamber and the water or other solvent is removed from the coating composition, leaving a coating of the polymer composition on the respective portion of each fastener in the fastener assembly, and the fastener assembly is cooled for packaging. The onset of air upon exiting the vacuum of the coating chamber at least partially removes the solvent from the coating composition, as well as at least partially cools the fastener assembly.

The coated fastener assemblies of this invention can be assembled along a conveyor, creating a long strip of fastener assembly. The faster assembly can be cut into segments, or shorter fastener assemblies, having a desired size for packaging.

Figure 3:
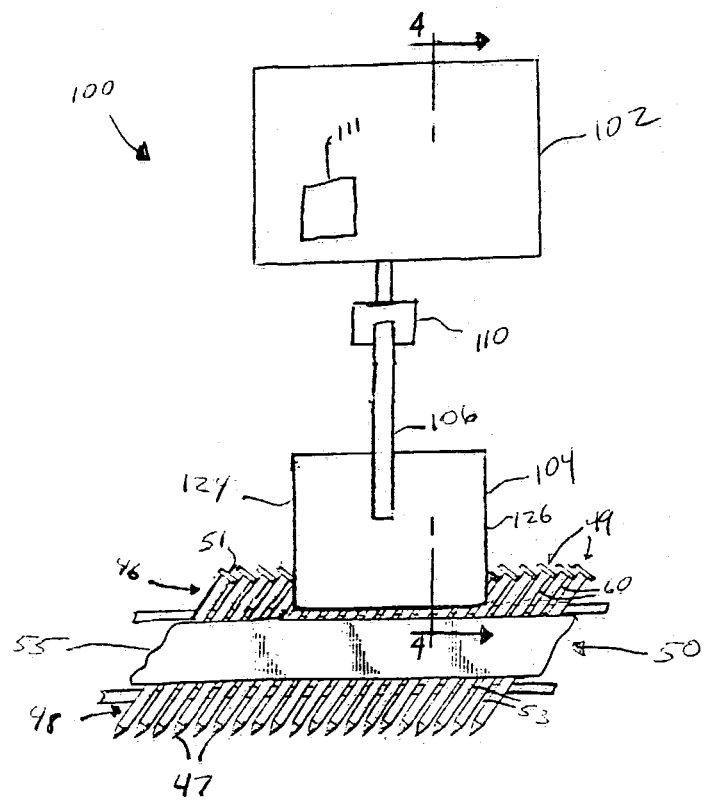
FIG. 3 is a top plan view of a general representation of a vacuum coating apparatus according to this invention in combination with a fastener assembly.
Figure 4:
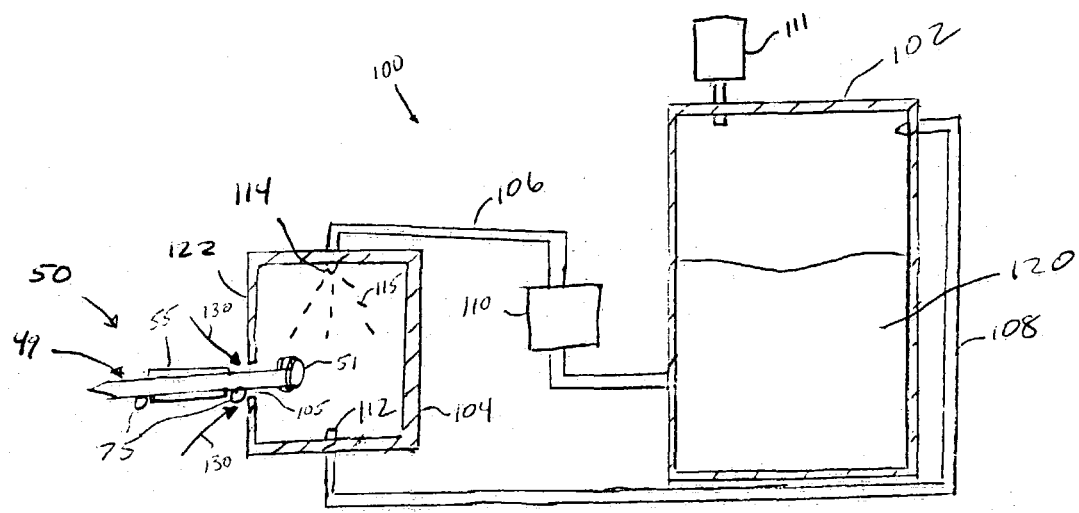
FIG. 4 is a partial cross-sectional view of the vacuum coating apparatus according to the invention, taken along line 3-3 in FIG. 3, in combination with the fastener assembly.

FIGS. 3 and 4 show a general representation of a vacuum coating apparatus 100 according to one embodiment of this invention and useful for vacuum coating a fastener assembly. The vacuum coating apparatus 100 includes a coating storage chamber 102 and a coating chamber 104. The coating storage chamber 102 is connected to the coating chamber 104 by a spray line 106 and a return line 108. A coating pump 110 in combination with the spray line 106 and the return line 108 pumps the coating composition 120 into the coating chamber 104 through nozzle 114. A vacuum pump 111 connected to the coating storage chamber 102 creates a vacuum environment in the coating chamber 104 by removing air in the coating chamber 104 through intake 112.

The nail assembly 50 travels from the nail collating machine (not shown) on two conveyor bands 75. Each of the conveyor bands 75 is desirably positioned on either side of the collation tape 55, and the band conveyors can include notches to hold the individual nails 49 of the nail assembly 50. The nail assembly 50 travels on the conveyor bands 75 to the coating chamber 104. The coating chamber includes an opening 105 across a face 122. The opening 105 partially extends into both a first side wall 124 and a second side wall 126 of the coating chamber 104. The opening 105 is configured to allow the head portions 51 and the upper shank portions 46 of the nail assembly 50 to enter the opening 105 at the first side wall 124 and travel through the coating chamber 104 and exit the opening at the second side wall 126.

The coating composition 120 is introduced into the coating chamber 104 as a spray 115 though nozzle 114. The coating composition fills the coating chamber 104 and coats the portion of the nail assembly 50 passing through the coating chamber 104, more particularly the head portions 51 and the upper shank portions 46. The vacuum created by suction through intake 112 draws in air, shown by arrows 130, through the opening 105. The air passes over the nails 49 and provides the desired benefits of wiping off excess coating composition from the nails 49, thereby resulting in an even application of the coating composition 120, as well as drying the coating composition, leaving the nails 49 coated with the polymer composition coating 60, and cooling of the fastener assembly 50. As the nails 49 exit the opening 105 at the second side wall 126, the additional air flow will typically provide sufficient additional drying of the coating composition and cooling of the fastener assembly so that the fastener assembly can be cut into the desired size for sale and packaged without additional substantial drying or cooling.

As will be appreciated by one skilled in the art following the disclosure herein provided, the coating composition of this invention can be applied by vacuum coating to only the head, the tip, or the upper or lower shank portion of each fastener, as well as combinations of these fastener parts. To apply the coating composition to the tip and lower shank portion of each fastener, for example, the tip and the lower shank portion of each fastener can be run through the coating chamber. For example, the vacuum coating apparatus 100 shown in FIGS. 3 and 4 can be positioned on the opposite side of the conveyor bands 75 so that the tips 47 and the lower shank portions 48 travel through the coating chamber 104. In another embodiment, a second vacuum coating apparatus can be positioned on the other side of the conveyor bands from the vacuum coating apparatus to coat both the heads and/or upper shank portions as well as the tips and/or lower shank portions.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

Whats claimed is:

1. A fastener assembly, comprising:
a plurality of plated fasteners arranged in a row, each of the plated fasteners including a shank, a head connected to the shank, a tip at an end of the shank opposite the head, and a single protective plating, the protective plating consisting essentially of zinc;

a collation component bonded to the shanks of the plated fasteners and maintaining the plated fasteners in the row; and a polymer composition applied directly to the single protective plating and coating the head and a portion of to shank, the polymer composition consisting essentially of about 50-95% by weight of a polymer material and about 5-50% by weight metal particles which consist of aluminum, and covering less than 50% of a total length of each fastener.

2. The fastener assembly of claim 1, wherein the coated portion of the shank includes at least one of a portion of the shank between the head and the collation component and a portion of the shank between the tip and the collation component.

3. The fastener assembly of claim 1, wherein the polymer material comprises a polyurethane polymer.

4. The fastener assembly of claim 3, wherein the polymer material comprises an aliphatic polyurethane polymer.

5. The fastener assembly of claim 1, wherein the polymer composition comprises about 70% to about 95% by weight of the polymer material and about 5% to about 30% by weight of the metal particles.

6. The fastener assembly of claim 1, wherein the polymer composition comprises about 80% to about 90% by weight of the polymer material and about 10% to about 20% by weight of the metal particles.

7. The fastener assembly of claim 1, wherein about 10% to about 20% of a total length of each fastener is coated with the polymer composition.

8. The fastener assembly of claim 1, wherein about ⅜ inch or less of a length of the shank directly adjacent to at least one of the head and the tip of each fastener is coated with the polymer composition.

9. The fastener assembly of claim 1, wherein a portion of each fastener shank bonded to the collation component is not coated with the polymer composition.

10. The fastener assembly of claim 1, wherein the polymer composition is dispersed in water.

11. The fastener assembly of claim 10, wherein the polymer composition comprises an aliphatic polyurethane polymer.

12. The fastener assembly of claim 10, wherein the polymer composition comprises about 80% to about 95% by weight polyurethane and about 5% to about 20% by weight of the metal particles.

13. The fastener assembly of claim 1, wherein the polymer composition additionally comprises a filler material selected from the group consisting of corrosion protection materials, ultraviolet protection materials, and combinations thereof.

14. The fastener assembly of claim 1, wherein the collation component is a collating tape.

15. The fastener assembly of claim 1, wherein the nails are slanted relative to the collation component.

16. The fastener assembly of claim 15, wherein the nails have a degree of slant of about 10-40 degrees.

17. The fastener assembly of claim 15, wherein the nails have a degree of slant of about 15-25 degrees.

18. The fastener assembly of claim 1, wherein the metal particles have an average particle diameter of 1-100 microns.

19. The fastener assembly of claim 18, wherein the average particle diameter is 5-75 microns.

20. The fastener assembly of claim 18, wherein the average particle diameter is 10-50 microns.

21. The fastener assembly of claim 1, wherein the polymer composition coating has a thickness of about 0.25-5 mils.

22. The fastener assembly of claim 1, wherein the polymer composition coating has a thickness of about 0.1-3 mils.

23. The fastener assembly of claim 1, wherein the single protective plating comprises galvanized zinc.

* * * * *